United States Patent Office 3,412,143
Patented Nov. 19, 1968

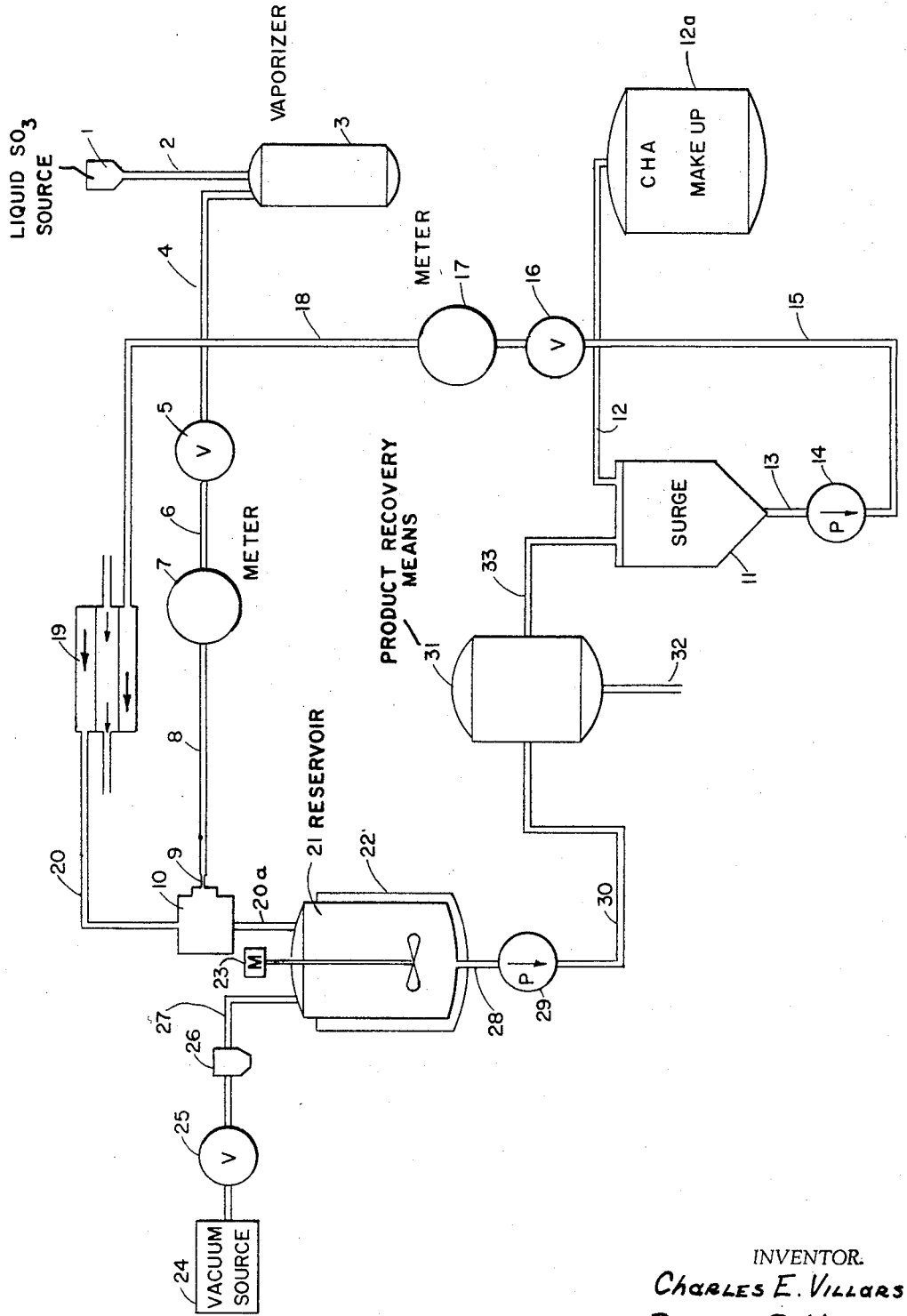

3,412,143
PROCESS FOR THE PRODUCTION OF AMINE SALTS OF SULFAMIC ACID
Charles E. Villars, Golden Valley, and Darrel D. Mitchell, South Minneapolis, Minn., assignors to The Pillsbury Company, Minneapolis, Minn., a corporation of Delaware
Filed June 21, 1965, Ser. No. 465,494
11 Claims. (Cl. 260—501.12)

ABSTRACT OF THE DISCLOSURE

Amine salts of sulfamic acid (e.g., cyclohexylamine cyclohexylsulfamate) are prepared by injecting gaseous sulfur trioxide at a pressure of less than 100 mm. Hg absolute into a turbulent reaction zone containing a primary and/or secondary amine. The molar ratio of amine to injected sulfur trioxide is at least 20:1 and turbulence of the reaction zone is maintained at a reynolds number of at least 5,000. Temperature of the reaction zone is maintained between about 15° C. to about 65° C.

---

This invention relates to the sulfonation of amines, more particularly the present invention relates to the sulfonation of organic amines with sulfur trioxide.

It has heretofore been proposed to prepare cyclohexylamine cyclohexyl sulfamate and salts of cyclohexyl sulfamic acid by reacting cyclohexylamine with metallic chlorosulphonates, sulfur trioxide, pyridine-sulfur trioxide addition compounds, chlorosulphonic acid, dioxane-sulfur trioxide addition compounds, oleum, ethyl chlorosulphonate, etc. Such sulfonation methods are shown, for example, in Butler and Andrieth, J.A.C.S., vol. 61, pp. 914–15; in Berict 30:869–70, Paul and Lowitsch; Andrieth and Sveda, Chem. Rev., vol. 26, February 1940, p. 62; British Patent 662,800 and United States Patent 2,275,125 by Andrieth et al. Belgian Patent 628,359 by M. V. Mhatre discloses a method for sulfonating cyclohexylamine with sulfur trioxide. Unfortunately, the method of Belgian Patent 628,359 has several concomitant disadvantages. Included among the disadvantages thereof is that the method necessitates the employment of such large quantities of inert gas diluent along with costly gas recovery means, thus the method has severe commercial limitations. Other concomitant disadvantages of the Belgian patent method include undesirable formation of adverse side reactions and products such as charring of the cyclohexylamine cyclohexyl sulfamate, dehydration of cyclohexylamine cyclohexyl sulfamate (i.e.

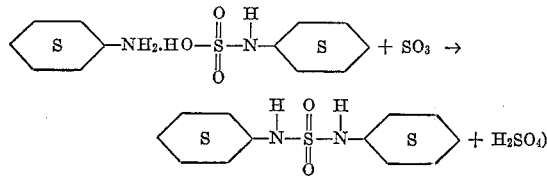

formation of bis (cyclohexyl amino) sulfone, hydration of sulfur trioxide to the sulfate form, deposition of solid sulfur trioxide in the reaction system and reduction of the sulfur trioxide to sulfur dioxide.

It is an object of the present invention to prepare amine salts of sulfamic acid by reacting amines with sulfur trioxide.

Another object of the invention is to provide a cheap and efficient means of preparing cyclohexylamine cyclohexyl sulfamate.

A further object of the present invention is to provide a continuous method of preparing cyclohexylamine cyclohexyl sulfamate.

An additional object is to provide a method of sulfonating cyclohexylamine by direct sulfonation with sulfur trioxide which does not necessitate the employment of an inert diluent.

It is another object of the invention to prevent the formation of adverse side reaction products in the sulfonation of cyclohexylamine with sulfur trioxide.

According to the present invention there is provided a method preparing amine salts of sulfamic acid which comprises sulfonating amines containing at least one liable hydrogen atom with sulfur trioxide in a zone of high turbulence at pressure of less than 100 mm. Hg absolute at a temperature and time sufficient to provide the amine salt of sulfamic acid.

In a more specific embodiment of the invention there is provided a method of preparing cyclohexylamine cyclohexyl sulfamate which comprises sulfonating cyclohexylamine with sulfur trioxide in a zone of high turbulence at a pressure of less than 100 mm. Hg absolute and at a temperature and time sufficient to provide cyclohexylamine cyclohexyl sulfamate. The sulfonation method proceeds according to the following chemical reaction:

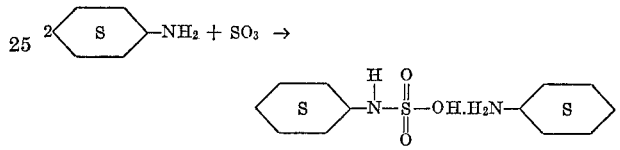

The accompanying illustrative schematic drawing depicts one of several possible ways of continuously preparing cyclohexylamine cyclohexyl sulfamate by sulfonating cyclohexylamine in vacuo with sulfur trioxide.

Referring to the drawing, liquid sulfur trioxide contained within a sulfur trioxide source 1 is conducted to a sulfur trioxide generator 3 through conduit 2. In order to regulate the amount of sulfur trioxide to be admitted into the primary reactor 9, the vaporized sulfur trioxide is conducted through conduit 4 to a sulfur trioxide control valve 5 and then onto a sulfur trioxide metering device 7 through conduit 6 and admitted via conduit 8 to primary reactor 10 under vacuum conditions suitably provided by passing the gaseous stream through a fixed resistance means 9 (e.g. eductor).

Cyclohexylamine is suitably provided to the primary reactor by means of a cyclohexylamine surge tank 11 adapted to receive cyclohexylamine from cyclohexylamine tank 12a through conduit 12 and connected to conduit 33 which provides recycled cyclohexylamine. The cyclohexylamine from surge tank 11 is pumped by pump 14 through conduits 13 and 15 through valve 16 and a cyclohexylamine metering device 17, not necessary in practicing the invention, which provides the proper amount of cyclohexylamine to be admitted to the primary reactor 10. In order to maintain the proper reaction temperature in the primary reactor 10 the recycled cyclohexylamine is conducted through a conduit 18 to a heat exchanger 19 and then to the primary reactor 10 through conduit 20. The cyclohexylamine and sulfur trioxide from the primary reactor 10 is then passed through a zone of turbulence 20a such as a baffled pipe having a reynolds number of at least 5,000 to insure adequate mixture thereof into a reservoir vessel 21 suitably provided with thermal means 22 such as a water jacket and an agitating means 23 such as a mechanical stirrer. The reservoir vessel 22 aids in crystallization and recovery of cyclohexylamine cyclohexyl sulfamate. A secondary vacuum source is maintained within the reservoir vessel 22 by means of vacuum source 24 suitably provided with a vacuum control valve 25 and vacuum conduit 27 and cold trap 26. In addition, the secondary vacuum source, although not essential, provides a vacuum upon the zone of turbulence 20a and the primary reactor 10.

The reaction product (i.e. cyclohexylamine cyclohexyl sulfamate precipitate) and unreacted cyclohexylamine is withdrawn from the secondary reactor via means of conduit 28 and pump 29 and conducted through conduit 30 to a product recovery means 31 (such as a continuous filter, multiple batch filters in parallel or centrifuge for solid and liquid separation) wherein the cyclohexylamine cyclohexyl sulfamate precipitate is separated from unreacted cyclohexylamine. The solid cyclohexylamine cyclohexyl sulfamate is then conducted through conduit 32 for process modifications not shown (e.g. preparation of the sodium and calcium cyclamate) and the unreacted cyclohexylamine is returned to the surge tank 11 via conduit 33 for recycling.

Amines contemplated in the sulfonation process are the N-substituted amines having at least one hydrogen atom contiguously attached the nitrogen atom (i.e. primary and secondary amines). Typical amines employed in the method are amines containing acyclic and homocyclic hydrocarbon groups. In general the amines have a formula:

$$R-\underset{\underset{H}{|}}{N}-R^1$$

where R is a hydrocarbon group free from ethylenic unsaturation and having less than 20 carbon atoms such alkyl, aryl, arylalkylene, alkylarylene, cycloalkyl, alkylcycloalkyl, aryl-alkyl-cycloalkyl, etc.; $R^1$ is hydrogen or hydrocarbon group free from ethylenic unsaturation and having less than 20 carbon atoms such as alkyl, aryl, arylalkylene, alkylarylene, cycloalkyl, alkyl-cycloalkyl, aryl-alkyl-cycloalkyl, etc. Illustrative amines include 1-methyl cyclohexylamine, cyclohexylamine, 3-methylpentyl amine, N-methylcyclohexylamine, N-methylpropylamine, N-isoamylamine, benzylamine, phenylamine, N - cyclohexylpenylamine, phenylenediamine, P-aminodiphenylmethane, N-phenylbutylamine, isoamylphenylamine, N-ethylphenylamine, N-cyclohexyl-3 methylphenylamine, 1,3-propylenediamine, 3-benzylcyclopentylamine, dibutylamine and mixtures thereof. Amines preferably adapted to the method of the instant invention are the amines having boiling point ranging from about 100° C. at 760 mm. Hg absolute to about 200° C. at 760 mm. Hg absolute. The preferred amine is cyclohexylamine.

In the present process it is a critical process condition that the sulfur trioxide be admitted to the amine for reaction therewith at a pressure less than 100 mm. Hg absolute. In general the pressure at the point of admixture with the amine is maintained at less than 100 mm. Hg absolute. Advantageously the pressure ranges from about 10 mm. to about 90 mm. Hg absolute with exceptional results being achieved in the range of about 15 to about 50 mm. Hg absolute. The necessary pressure at the loci at which the sulfur trioxide is initially admixed with the amine may be provided by a vacuum creating mixing device of a venturi flow system such as a liquid jet eductor, a secondary vacuum source applied in proximity of the point of entry or by applying a vacuum upon the primary reactor and zone of turbulence such as illustrative in the drawings (i.e. placing reservoir vessel under vacuum, etc.). Adequate admixture of the amine and sulfur trioxide in vacuo is provided by subjecting the cyclohexylamine and sulfur trioxide to a high degree of turbulence (i.e. a reynolds number of at least 5,000 and preferably greater than 10,000). The necessary degree of turbulence can be provided, for example, by mechanical agitation, tubular turbulent reactor, a baffled pipe such as a vigreux column, etc. Preferably the zone of turbulence is provided with a means of heating the admixture to a temperature between about 15° C. to about 65° C. and preferably between about 20° C. to about 50° C. (i.e. the reaction temperature). Principle formation of the amine salt of sulfamic acid thus occurs in the primary reactor and the turbulent zone.

The molar ratio of amine to sulfur trioxide admixed herein in the method of the invention is at least 20:1. Typical molar ratios of amine to sulfur trioxide ranges from about 30:1 to about 150:1 and most preferably between about 45:1 to about 55:1.

It has been found that the instant method substantially eliminates adverse side reactions of the cyclohexylamine, sulfur trioxide and cyclohexylamine cyclohexyl sulfamate such as charring, dehydration and sulfone formation of the cyclohexylamine cyclohexyl sulfamate, hydration of sulfur trioxide and formation of sulfur dioxide. In addition, the method provides a convenient and cheap method of preparing cyclohexylamine cyclohexyl sulfamate which does not necessitate costly and bulky means of providing and recovering the inert gas. Moreover the sulfonation method provides complete reaction of the available sulfur trioxide with cyclohexylamine. Similar benefits are achieved when other amines are employed.

The following example is illustrative of a manner of practicing the invention:

EXAMPLE I

Employing a laboratory installation, similar to that schematically illustrated in the drawing, wherein the primary reactor 10, and fixed resistor 9 consisted of a liquid eductor (Ace Glass Co. Catalogue Number 8727), the zone of turbulence 20a was provided by a vigreux column, the reservoir vessel 22 comprises a 2.5 liter resin kettle provided with a mechanical stirrer, heating mantle and a thermometer; pumps 14 and 29 consisted of a laboratory pump; cyclohexylamine cyclohexyl sulfamate recovery means 31 consisted of a seitz 2 liter batch filter, the sulfur trioxide generator 3 consisted of a 250 ml. flash equipped with a heating mantle and thermometer; the cyclohexylamine meter 17 and control valve 16 was a laboratory rotometer, a secondary vacuum source 24 was provided with a manual control and a cold trap 26 which consisted of a dry ice/acetone cold finger trap and surge tank 11 comprises a 2.5 liter resin kettle with a bottom outlet. The heat exchanger 19, sulfur trioxide control valve 5 and meter 7 were not employed. The reservoir vessel 22 was maintained at a pressure of 50 mm. Hg absolute and at a temperature of 40° C. (Below 30° C. the cyclohexylamine and cyclohexylamine cyclohexyl sulfamate solidified.) Liquid sulfur trioxide was vaporized in the sulfur trioxide generator at 45° C. The molar ratio of cyclohexylamine to sulfur trioxide was maintained at about 50:1. By means of the eductor, the gaseous sulfur trioxide was maintained at a pressure of about 50 mm. Hg absolute. Reaction temperature was at about 35° C. Formation of the salt appeared to be instantaneous. Infrared analysis of the reaction product produced the characteristic curve of cyclohexylamine cyclohexyl sulfamate. Melting point of the product was 195° C.

What is claimed is:
1. The method of preparing amine salts of sulfamic acid by reacting amines with sulfur trioxide which comprises:
(a) providing gaseous sulfur trioxide at a pressure of less than 100 mm. Hg absolute to a reaction zone consisting essentially of an amine at a molar ratio of amine to sulfur trioxide of at least 20:1, said amine being further characterized as having the formula:

$$R-\underset{\underset{H}{|}}{N}-R^1$$

wherein R is a hydrocarbon having less than 20 carbon atoms and free from ethylenic unsaturation and $R^1$ is a member selected from the group consisting of hydrogen and a hydrocarbon having less than 20 carbon atoms and free from ethylenic unsaturation;
(b) admixing the amine and sulfur trioxide under turbulent conditions as evidenced by a reynolds number of at least 5,000 and at a temperature ranging from about 15° C. to about 65° C. for a time interval sufficient to provide the amine salt of sulfamic acid.

2. The method according to claim 1 wherein the pressure of the gaseous sulfur trioxide is maintained from about 10 to about 90 mm. Hg absolute.

3. The method according to claim 2 wherein the molar ratio of amine to sulfur trioxide ranges from about 30:1 to about 150:1.

4. The method according to claim 3 wherein the amine is cyclohexylamine.

5. The process according to claim 4 wherein the pressure of the gaseous sulfur trioxide provided to the reaction zone ranges from about 15 mm. to about 50 mm. Hg absolute, the temperature in the reaction zone is maintained between about 20° C. to about 50° C. and the cyclohexylamine and sulfur trioxide are admixed at a reynolds number of at least 10,000.

6. The method according to claim 5 wherein the molar ratio of cyclohexylamine to sulfur trioxide ranges from about 45:1 to about 55:1.

7. A method of continuously preparing amine salts of sulfamic acid by reacting amines with sulfur trioxide which comprises:
 (a) providing a gaseous stream consisting essentially of sulfur trioxide to a reaction zone consisting essentially of cyclohexylamine at a molar ratio of cyclohexylamine to sulfur trioxide of at least 20:1, said gaseous sulfur trioxide being provided to the reaction zone at a pressure of less than 100 mm. Hg absolute;
 (b) admixing the amine and sulfur trioxide under turbulent conditions as evidenced by a reynolds number of at least 5,000;
 (c) reacting the sulfur trioxide and amine at a temperature ranging from about 15° to about 65° C. for a time interval sufficient to provide the amine salt of sulfamic acid;
 (d) recovering a portion containing the amine salt of sulfamic acid; and
 (e) recycling cyclohexylamine to the reaction zone.

8. The method according to claim 7 wherein the gaseous sulfur trioxide is provided to the reaction zone at a pressure ranging from about 10 to about 90 mm. Hg absolute.

9. The method according to claim 8 wherein the amine is cyclohexylamine; the sulfur trioxide is provided to the reaction zone at a pressure ranging from about 15 to about 50 mm. Hg absolute at a molar ratio of sulfur trioxide to cyclohexylamine ranging from about 1:30 to 1:150; the cyclohexylamine and sulfur trioxide are admixed at a reynolds number of at least 10,000 and the temperature of the reaction zone is maintained from about 20° C. to about 50° C.

10. The method according to claim 9 wherein the molar ratio of sulfur trioxide to cyclohexylamine ranges from about 1:45 to about 1:55.

11. The method according to claim 10 wherein the recovered portion or amine salt of sulfamic acid consists essentially of cyclohexylamine cyclohexylsulfamate.

References Cited

UNITED STATES PATENTS

| | | |
|---|---|---|
| 3,169,142 | 2/1965 | Knaggs et al. |
| 3,226,430 | 12/1965 | Mhatre. |
| 3,248,413 | 4/1966 | Motl. |
| 3,270,038 | 8/1966 | Marshall et al. |

FOREIGN PATENTS 1,359,176  3/1964  France.

BERNARD HELFIN, *Primary Examiner.*

M. W. GLYNN, *Assistant Examiner.*